US 12,206,321 B2

United States Patent
Ptacek et al.

(10) Patent No.: US 12,206,321 B2
(45) Date of Patent: Jan. 21, 2025

(54) BOOTSTRAP CLAMP CIRCUIT AND METHOD

(71) Applicant: SEMICONDUCTOR COMPONENTS INDUSTRIES, LLC, Phoenix, AZ (US)

(72) Inventors: Karel Ptacek, Roznov Pod Radhostem (CZ); Dhruv Chopra, Gilbert, AZ (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 100 days.

(21) Appl. No.: 17/933,935

(22) Filed: Sep. 21, 2022

(65) Prior Publication Data
US 2024/0097555 A1    Mar. 21, 2024

(51) Int. Cl.
*H02M 1/088* (2006.01)
*H02M 1/00* (2007.01)

(52) U.S. Cl.
CPC ......... *H02M 1/088* (2013.01); *H02M 1/0006* (2021.05)

(58) Field of Classification Search
CPC .............................. H02M 1/088; H02M 1/0006
See application file for complete search history.

(56) References Cited

U.S. PATENT DOCUMENTS

| | | | |
|---|---|---|---|
| 5,381,051 A * | 1/1995 | Morton | H02M 3/073 326/88 |
| 10,574,229 B1 * | 2/2020 | Nandi | H03K 17/162 |
| 10,778,099 B1 * | 9/2020 | Womac | H02M 1/32 |
| 2013/0241621 A1 * | 9/2013 | Forghani-Zadeh | H03K 17/08122 327/315 |

FOREIGN PATENT DOCUMENTS

CN    112104207 A  * 12/2020  ............ H02M 3/073

* cited by examiner

*Primary Examiner* — Lincoln D Donovan
*Assistant Examiner* — James G Yeaman
(74) *Attorney, Agent, or Firm* — Polansky & Associates, P.L.L.C.; Paul J. Polansky

(57) ABSTRACT

A driver is suitable for use with a gallium nitride (GaN) power stage, and includes a voltage regulator and a high side driver. The voltage regulator provides a boot voltage between first and second terminals thereof that varies within a range between a turn-on voltage of a GaN transistor, and a safe voltage limit between a gate and a source thereof throughout an active time of said GaN transistor. The high side driver has an input for receiving a high side drive signal, an output for coupling to said gate of said GaN transistor, a power supply terminal coupled to said first terminal of said voltage regulator, and a ground terminal for coupled to said second terminal of said voltage regulator.

18 Claims, 6 Drawing Sheets

BOOTSTRAP CLAMP CIRCUIT AND METHOD

FIELD OF THE DISCLOSURE

This disclosure relates generally to driver circuits, and more specifically to driver circuits for use with switch mode power supplies such as those using gallium-nitride (GaN) transistors and the like.

BACKGROUND

Power converters are useful in many modern electronic products. One type of power converter, known as a buck converter, receives an input voltage and regulates it to a lower, regulated constant (DC) voltage. A switch-mode buck converter regulates the on-time of one or more switching transistors based on a feedback voltage to regulate to output voltage to a desired value.

Some switching converters use gallium nitride field effect transistors (GaN FETs). GaN FETs can switch faster than conventional metal-oxide-semiconductor (MOS) FETs, but are more sensitive and demanding in their usage. For example, the gate-to-source voltage ($V_{GS}$) applied to GaN FETs is very sensitive to voltage excursions. A $V_{GS}$ of about 5 volts (V) is required to achieve saturation, but a $V_{GS}$ of only about 6 V or more can cause soft damage by increasing the GaN FET's on-resistance (RDSON), and a $V_{GS}$ of about 7 V or more can permanently damage the GaN FET.

Buck-mode switching converters based on GaN FETs alternately drive an input voltage on a first terminal of an inductive element to a positive voltage, and then drive the first terminal of the inductive element to a lower voltage, such as ground, through either a synchronous rectifier on the low side of the inductor or a passive diode. A problem occurs during switching, however. When transitioning between driving high and conducting low, there is a period of time during which neither the high-side transistor is driving, nor the low-side synchronous rectifier or passive switch is conducting. Since the inductor resists a sudden change in current, it generates a significant negative voltage on its first terminal and to which the source of the high-side GaN FET is connected. While in the floating bootstrap configuration, this negative voltage on the source of the GaN FET results in a large positive gate-to-source voltage across the GaN FET and damages the GaN FET.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
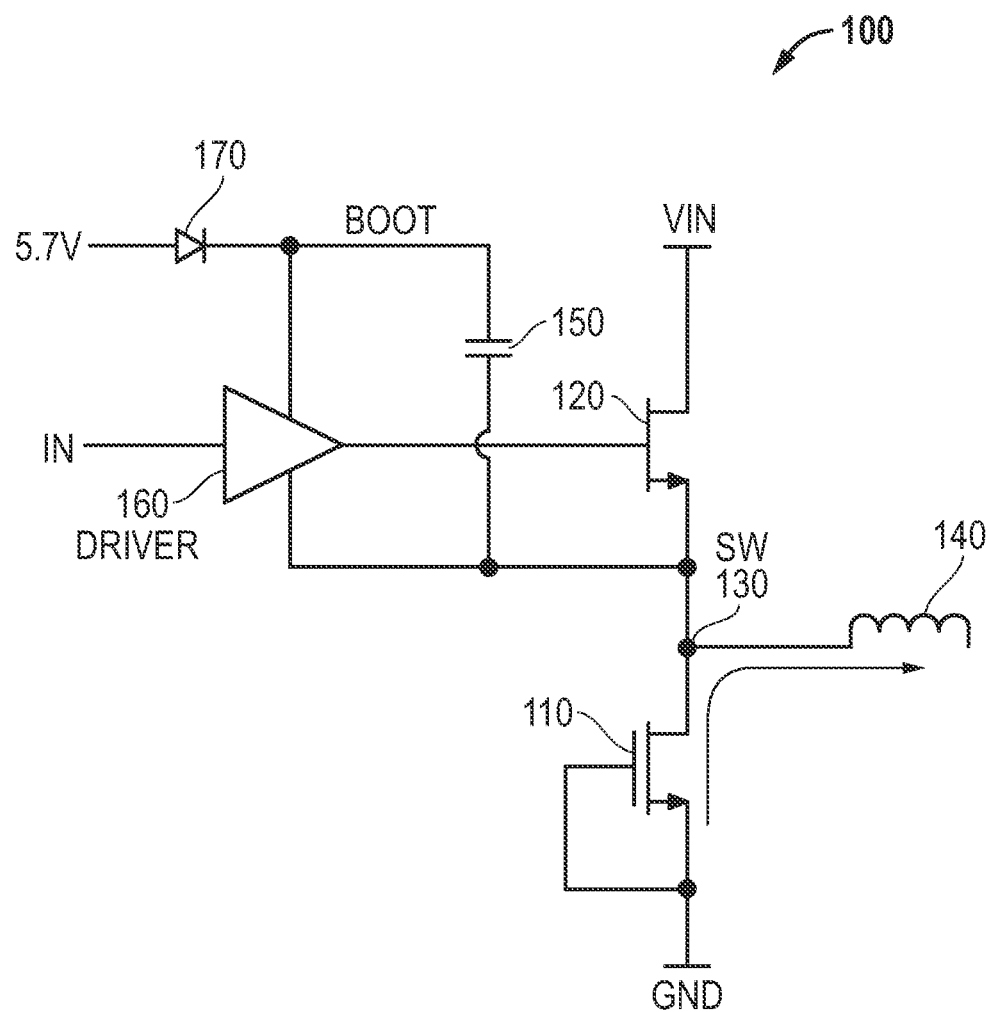
FIG. 1 illustrates in partial block diagram and partial schematic form a bootstrap driver circuit known in the prior art.

FIG. 1 illustrates in partial block diagram and partial schematic form a bootstrap driver circuit 100 known in the prior art. Bootstrap driver circuit 100 includes transistors 110 and 120 connected at a switch node 130 labelled "SW", a capacitor 150, a driver 160, and a diode 170. Transistor 110 is an N-channel metal-oxide-semiconductor field effect transistor (MOSFET) having a drain connected to switch node 130, a gate connected to ground, and a source connected to ground. Transistor 110 may be other types of FETs and may itself be a GaN FET, as will be described below. Transistor 120 is a gallium nitride field effect transistor (GaN FET) having a drain for receiving an input voltage labelled "VIN", a gate, and a source connected to switch node 130. As part of a buck converter, inductor 140 has a first terminal connected to switch node 130, and a second terminal for providing power to a load, not shown in FIG. 1. Capacitor 150 has a first terminal connected to a node labelled "BOOT", and a second terminal connected to switch node 130. Driver 160 has an input terminal for receiving an input signal labelled "IN", an output terminal connected to transistor 120, a positive power supply input terminal connected to the BOOT node, and a negative power supply input terminal connected to switch node 130. Diode 170 has an anode for receiving a voltage of 5.7 volts (V), and a cathode connected to the BOOT node.

In operation, bootstrap driver circuit 100 uses a low-side MOSFET transistor, i.e., transistor 110, and a high side GaN FET, i.e., transistor 120, to provide fast switching. Driver 160 receives IN as a pulse-width modulated signal and provides a switching signal based on output voltage feedback (not shown in FIG. 1) to control the duty cycle of the PWM signal to regulate the output voltage driven by the second terminal of inductor 140 to a desired value. Transistor 110 is diode connected to ensure that it becomes conductive when switch node 130 falls more than a threshold voltage below ground. A standard MOSFET includes a body diode conducting between source and drain, so overvoltage is not a serious problem.

In case transistor 110 is implemented as a GaN transistor for faster switching, however, the voltage really must fall more than a threshold value (3-4 Volts) because it lacks the body diode of a MOS FET. Diode 170 is forward biased when BOOT is below one diode voltage drop below the 5.7 V input, thus regulating the BOOT voltage to about 5.0 V. The negative voltage on SW node is added to the BOOT voltage, thus causing an overvoltage problem. This overvoltage problem occurs during switching and can damage a GaN FET transistor like transistor 120. When driver 160 stops driving a high voltage, as driver 160 discharges the voltage on the gate of GaN FET 120 below about 5 V, transistor 120 becomes non-conductive. Inductor 140, however, resists a sudden change in current, and drives a negative voltage on switch node 130 in order to preserve the current flow. Since transistor 110 lacks a body diode if it is also implemented as a GaN FET, inductor 140 drives a negative voltage onto the SW node and across capacitor 150. This negative voltage can be as low as −3 or −4 volts, and thus capacitor 150 is charged to 9 V (+5−(−4))=+9 volts. Subsequently when the IN signal again goes high, driver 160 drives VBOOT—SW of about 9 V between the gate and the source of transistor 120. This gate-to-source voltage is large enough to damage transistor 120.

Figure 2:
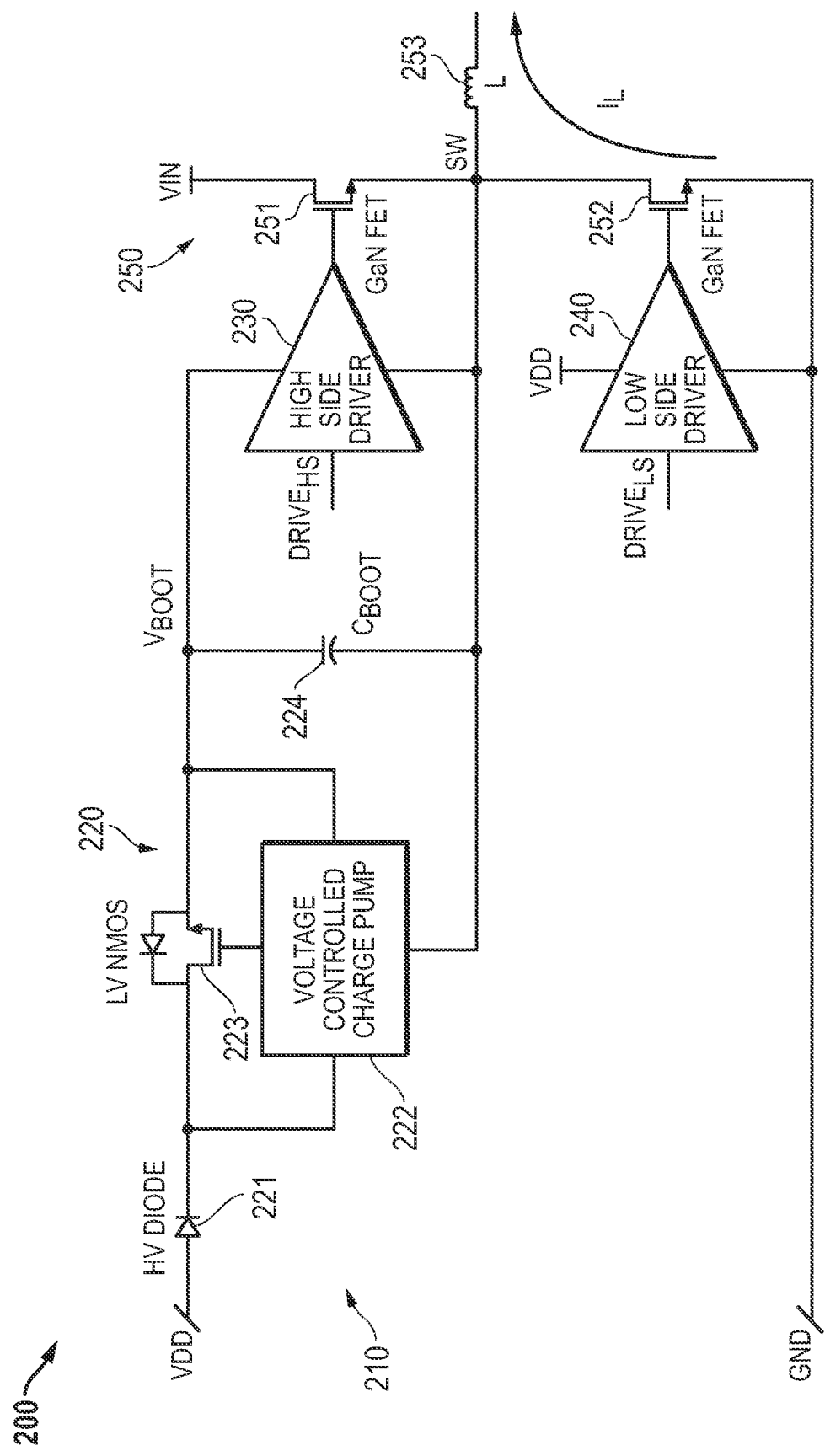
FIG. 2 illustrates in partial block diagram and partial schematic form a bootstrap driver circuit according to embodiments of the present disclosure.

FIG. 2 illustrates in partial block diagram and partial schematic form a bootstrap driver circuit 200 according to embodiments of the present disclosure. Bootstrap driver circuit 200 includes generally a driver 210 and a GaN FET power stage 250. Driver 210 includes generally a voltage regulator 220, a high-side driver 230, and a low-side driver 240.

Voltage regulator 220 includes a diode 221, a voltage-controlled charge pump 222, a transistor 223, and a capacitor 224. Diode 221 is a PN junction diode having an anode for receiving a power supply voltage labelled "$V_{DD}$", and a cathode. Voltage controlled charge pump 222 has a first input, a second input connected to a switch node labelled "SW", a third input connected to the cathode of diode 221, and an output. Transistor 223 is an N-channel metal-oxide-semiconductor field-effect transistor (MOSFET) having a drain connected to the cathode of diode 221, a gate connected to the output of voltage-controlled charge pump 222, a source connected to the first input of voltage-controlled charge pump 222 for providing a voltage labelled "$V_{BOOT}$", and has an intrinsic body diode having an anode connected to the source of transistor 223, and a cathode connected to the drain of transistor 223. Capacitor 224 has a first terminal connected to the source of transistor 223 and to the first input of voltage-controlled charge pump 222, and a second terminal connected to the SW terminal.

Driver 230 has an input for receiving a signal labelled "$DRIVE_{HS}$", an output, a positive power supply voltage terminal for receiving $V_{BOOT}$, and a ground terminal connected to the SW node.

Driver 240 has an input for receiving a signal labelled "DRIVE L s", an output, a positive power supply voltage terminal for receiving $V_{DD}$, and a ground terminal connected to a ground node labelled "GND".

GaN FET power stage 250 includes transistors 251 and 252 and an inductor 253. Transistor 251 is a GaN FET having a drain for receiving VIN, a gate connected to the output of high-side driver 230, and a source connected to the SW node. Transistor 252 is a GaN FET having a drain connected to the SW node, a gate connected to the output of low-side driver 240, and a source connected to GND.

In operation, bootstrap driver circuit 200 provides a regulated output voltage using voltage feedback by modulating the duty cycle of the high-side and low-side drive signals. It uses high-side and low-side GaN FETs to switch at high frequencies, but these GaN FETs are susceptible to damage upon the application of excessive gate-to-source voltages. It solves the problem of excessive gate-to-source voltages by regulating the voltage across capacitor 224 to limit the drive voltage across transistor 251 to a safe voltage that does not cause damage to it. Thus, bootstrap driver circuit 200 is able to obtain the fast switching speed of GaN FETs without damaging them during operation by the non-overlapping PWM drive signals.

Figure 3:
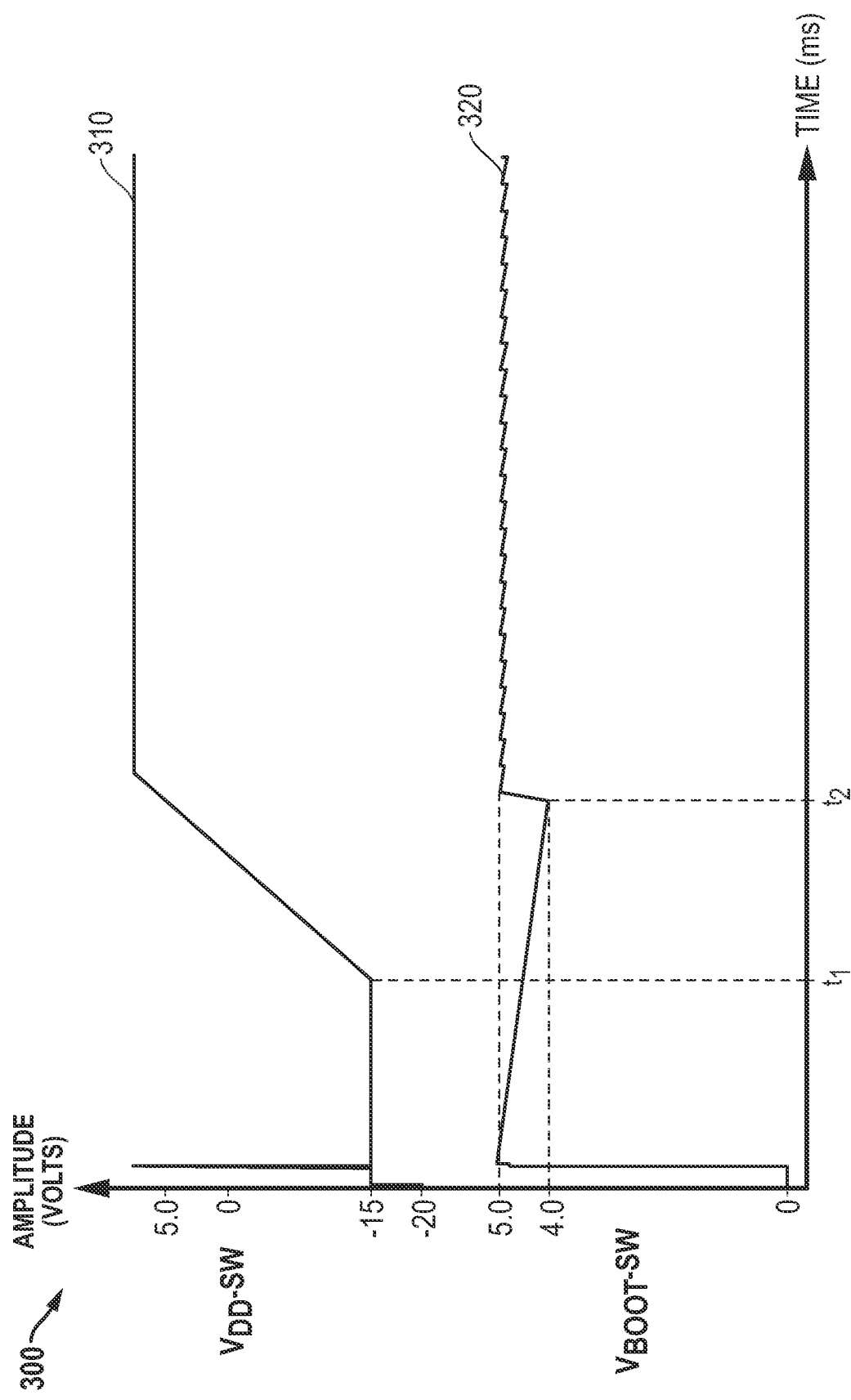
FIG. 3 illustrates a timing diagram of signals useful in understanding the operation of the bootstrap driver circuit of FIG. 2.

FIG. 3 illustrates a timing diagram 300 of signals useful in understanding the operation of bootstrap driver circuit 200 of FIG. 2. In timing diagram 300, the horizontal axis represents time in milliseconds (ms), and the vertical axis represent the amplitude of respective signals in volts (V). Shown in timing diagram 300 are two waveforms of interest, including a waveform 310 showing the quantity $V_{DD}$-$V_{SW}$, and a waveform 320 showing the quantity $V_{BOOT}$-$V_{SW}$, and two time points of interest, labelled "$t_1$" and "$t_2$". In driver 210, voltage regulator 220 regulates the amplitude of $V_{BOOT}$ so that $V_{BOOT}$-SW varies in an acceptable range of voltages of $V_{GS}$ when high-side driver 230 drives transistor 251 in an active state, which corresponds to waveform 320.

After start of switching and before time $t_1$, $V_{DD}$-SW spikes high momentarily and then remains at a low voltage of about −15 V while capacitor 224 is uncharged. It remains around −15 V until time $t_1$. $V_{BOOT}$-SW, however, limits the voltage across transistor 251 to about 5.0 V, which is high enough to bias transistor 251 to saturation, but low enough to protect it from soft damage that it would encounter if the $V_{GS}$ were driven to around 6.0 V or more. The value of $V_{BOOT}$-SW slowly decreases from 5.0 V. At time $t_1$, $V_{DD}$-SW starts to rise until at about time $t_2$, it reaches 4.0 V. At this time, voltage-controlled charge pump 222 becomes active to reduce the conductivity of transistor 223 to keep $V_{BOOT}$-SW regulated to about 5.0 V. Accordingly, after time $t_2$, $V_{BOOT}$-SW remains at about 5.0 V, but exhibits small ripples due to the operation of the regulation loop during switching cycles.

Figure 4:
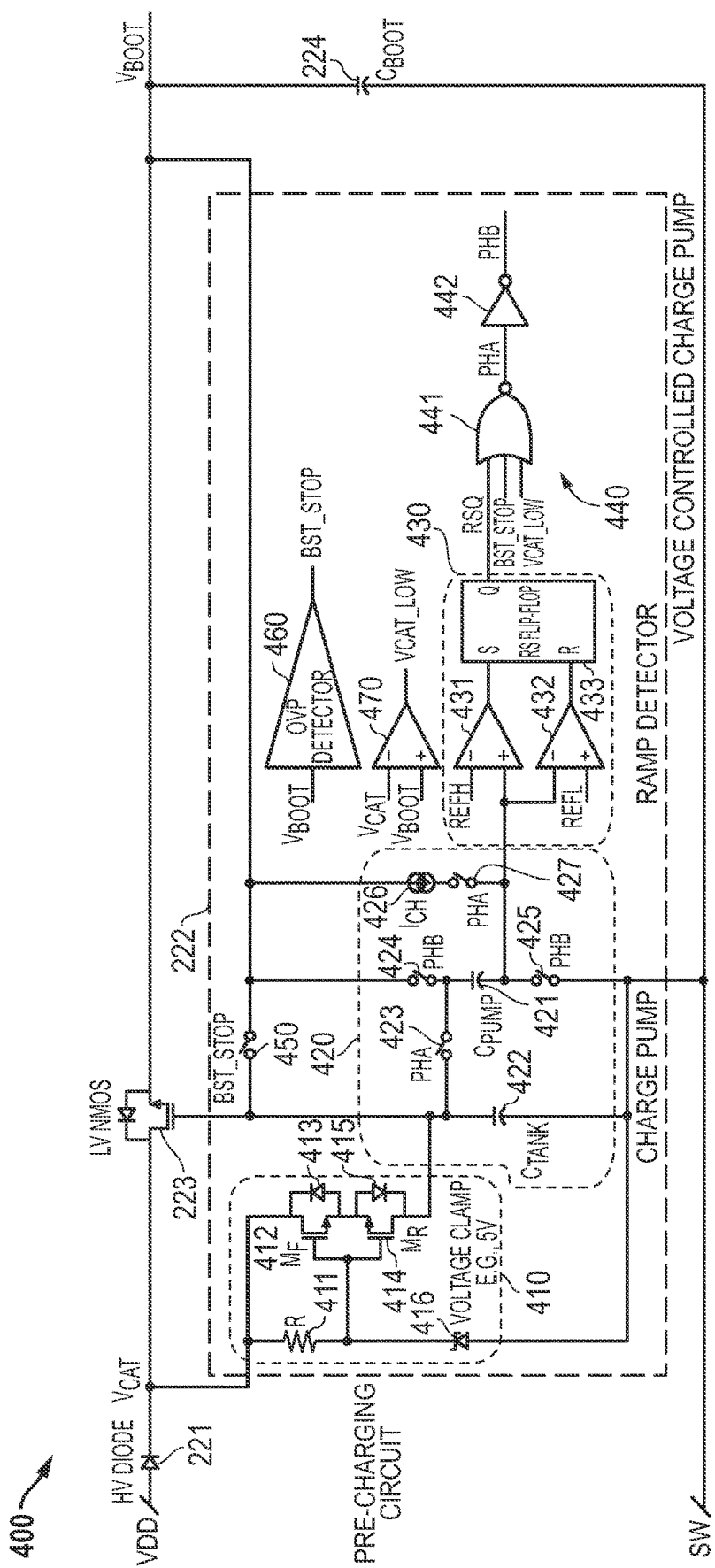
FIG. 4 illustrates in partial block diagram and partial schematic form a portion of a bootstrap driver circuit that can be used in the bootstrap driver circuit of FIG. 2 according to embodiments of the present disclosure.

FIG. 4 illustrates in partial block diagram and partial schematic form a portion of a bootstrap driver circuit 400 that can be used in bootstrap driver circuit 200 of FIG. 2 according to embodiments of the present disclosure. Bootstrap driver circuit 400 includes diode 221, transistor 223, and capacitor 224 as shown in FIG. 2. It includes a circuit implementation of voltage controlled charge pump 222 as will now be described. Voltage-controlled charge pump 222 includes a pre-charging circuit 410, a charge pump 420, a ramp detector 430, a logic circuit 440, a switch 450, an overvoltage protection detector 460, and a comparator 470.

Pre-charging circuit 410 includes a resistor 411, transistors 412 and 414, and a Zener diode 416. Resistor 411 has a first terminal connected to the cathode of diode 221, that provides a voltage labelled "$V_{CAT}$", and a second terminal, and has an associated resistance labelled "R". Transistor 412 is an N-channel MOS FET having a drain connected to the cathode of diode 221, a gate connected to the second terminal of resistor 411, and a source, and has an associated body diode 413 with an anode connected to the source of transistor 412, and a cathode connected to the drain of transistor 412. Transistor 414 is an N-channel MOS FET having a drain, a gate connected to the second terminal of resistor 411, and a source connected to the source of transistor 412, and has an associated body diode 415 with an anode connected to the source of transistor 414, and a cathode connected to the drain of transistor 414. Zener diode 416 has a cathode connected to the second terminal of resistor 411 and to the gates of transistors 412 and 414, and an anode connect to the SW node, and has an associated breakdown voltage of, for example, 5.0 V.

Charge pump 420 includes a pump capacitor 421, a tank capacitor 422, switches 423-425, a current source 426, and a switch 427. Pump capacitor 421 has first and second terminals. Tank capacitor 422 has a first terminal connected to the drain of transistor 414, and a second terminal connected to the SW node. Switch 423 has a first terminal connected to the first terminal of tank capacitor 422, a second terminal connected to the first terminal of pump capacitor 421, and is closed in response to the activation of a signal labelled "PHA". Switch 424 has a first terminal, a second terminal connected to the first terminal of pump capacitor 421, and is closed in response to the activation of signal labelled "PHB". Switch 425 has a first terminal connected to the second terminal of pump capacitor 421, a second terminal connected to the SW node, and is closed in response to the activation of signal PHB. Current source 426 has a first terminal, and a second terminal. Switch 427 has a first terminal connected to the second terminal of current source 426, and a second terminal connected to the SW node, and is closed in response to the activation of signal PHA.

Ramp detector 430 includes comparators 431 and 432, and a flip-flop 433. Comparator 431 has a negative input for receiving a voltage labelled "REFH", a positive input connected to the second terminal of pump capacitor 421, and an output. Comparator 432 has a negative input connected to the second terminal of pump capacitor 421, a positive input for receiving a voltage labelled "REFL", and an output. Flip-flop 433 is an RS flip-flop with a set or "S" input connected to the output of comparator 432, a reset or "R" input connected to the output of comparator 432, and a true or "Q" output.

Logic circuit 440 includes a NOR gate 441 and an inverter 442. NOR gate 441 is a three input NOR gate having a first input connected to the Q output of flip-flop 433, a second input for receiving the BST_STOP signal, a third input for receiving a signal labelled "VCAT_LOW_", and an output for providing the PHA signal. Inverter 442 has an input connected to the output of NOR gate 441, and an output for providing the PHB signal.

Switch 450 has a first terminal connected to the first terminal of tank capacitor 422, a second terminal connected to the source of transistor 223, and is closed in response to an activation of the BST_STOP signal.

Overvoltage protection detector 460 has an input for receiving the $V_{BOOT}$ signal, and an output for providing the BST_STOP signal.

Comparator 470 has a negative input for receiving $V_{CAT}$, a positive input for receiving $V_{BOOT}$, and an output for providing a signal labelled "VCAT_LOW".

Bootstrap driver circuit 400 is a circuit implementation of bootstrap driver circuit 200. Pre-charging circuit 410 ensures startup of charge pump 420. It uses a series combination of transistors, i.e., transistors 412 and 414, to avoid reverse current through their body diodes 413 and 415, respectively, but otherwise drives an initial voltage on the first terminal of tank capacitor 422.

Charge pump 420 alternately charges pump capacitor 421 and transfers charge into tank capacitor 422 to generate the gate voltage of transistor 223. During operation, the BST_stop signal is inactive at a logic low, and charge pump 420 generates a voltage on the gate of transistor 223 according to the duty cycle of phase control signals PHA and PHB.

Ramp detector 430 is used in combination with charge pump 420 to form a ramp oscillator, in which voltage $V_{REFH}$ and $V_{REFL}$ form the upper and lower thresholds, respectively, of the ramp oscillator. When the voltage at the output of charge pump 420 exceeds $V_{REFH}$, comparator 431 sets flip-flop 433, activating signal RSQ. When the voltage at the output of charge pump 420 drops below V REFL, comparator 431 resets flip-flop 433, de-activating signal RSQ. Since $V_{REFH} > V_{REFL}$, the output of comparator 431 is already low before the output of charge pump 420 falls below V REFL, allowing flip-flop 430 to be reset.

Voltage-controlled charge pump 222 also generates control signals to control its operation. Overvoltage protection detector 460 activates the BST_STOP signal when it exceeds an overvoltage threshold. When BST_STOP goes active at a logic high, NOR gate 441 keeps PHA low and inverter 442 keeps PHB high, preventing charge pump 420 from operating. Moreover, when $V_{CAT} < V_{BOOT}$, comparator 470 stops charge pump 420 by activating VCAT_LOW, which forces the output of NOR gate 441 low and keeps PHA low and inverter 442 keeps PHB high, preventing charge pump 420 from operating. This condition occurs when $V_{DD}$ is lower than the desired $V_{BOOT}$ voltage, and in this case, $V_{SW}$ floats high.

Bootstrap driver circuit 400 operates to drive transistor 251 within a range of limited gate-to-source voltages that drive it fully on over a wide range of input voltage VIN, while limiting the gate-to-source voltage to values that avoid degradation or damage. It is simple and compact in terms of circuit area. However, it should be apparent that the portion of bootstrap driver circuit 400 shown in FIG. 4 is just one possible circuit implementation, and other circuit implementations are possible. Moreover, individual circuits can be implemented to achieve similar overall operation in other ways than are shown in FIG. 4 that will be apparent to those of ordinary skill in the art.

Figure 5:
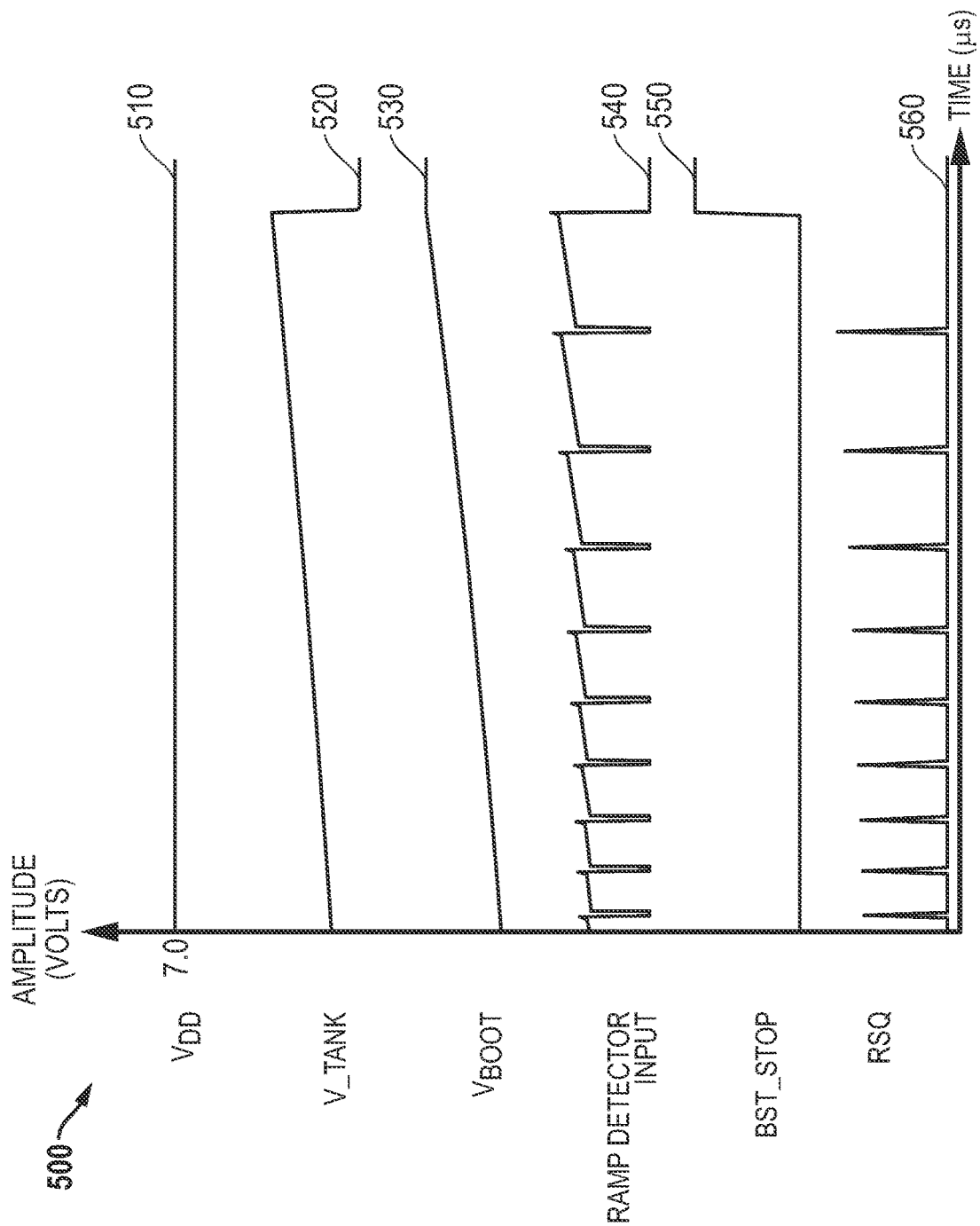
FIG. 5 illustrates a timing diagram of the bootstrap driver circuit of FIG. 4 during a first phase of operation.

FIG. 5 illustrates a timing diagram 500 of bootstrap driver circuit 400 of FIG. 4 during a first phase of operation. The first phase of operation corresponds to a startup phase. In timing diagram 500, the horizontal axis represents time in microseconds (μs), and the vertical axis represents the amplitude of respective signals in volts (V). Shown in timing diagram 500 are six waveforms of interest, including a waveform 510 of $V_{DD}$, a waveform 520 of V_TANK, a waveform 530 of $V_{BOOT}$, a waveform 540 of the input of ramp detector 430 labelled "RAMP DETECTOR INPUT", a waveform 550 of the BST_STOP signal, and a waveform 560 of the RSQ signal. During the period of time shown in timing diagram 500, $V_{DD}$ is constant at around 7.0 V. Over this period, V_TANK rises between about 6.0 V to about 8.5 V, and $V_{BOOT}$ rises from about 3.5 V to about 5.0 V. The RAMP DETECTOR INPUT periodically pulses low, but the high periods ramp during their active times from about 2.6 V to about 4.5 V at the end of the active periods, in which the active periods increase in length. During this period BST_STOP is inactive at a logic low. However, when $V_{BOOT}$ reaches about 5.0 V, overvoltage protection detector 460 activates the BST_STOP signal. In response to the activation of the BST_STOP signal, $V_{BOOT}$ remains at about 5.0 V but starts to decay slowly. The RAMP DETECTOR INPUT is driven low and remains low, and the RSQ signal stops pulsing.

Figure 6:
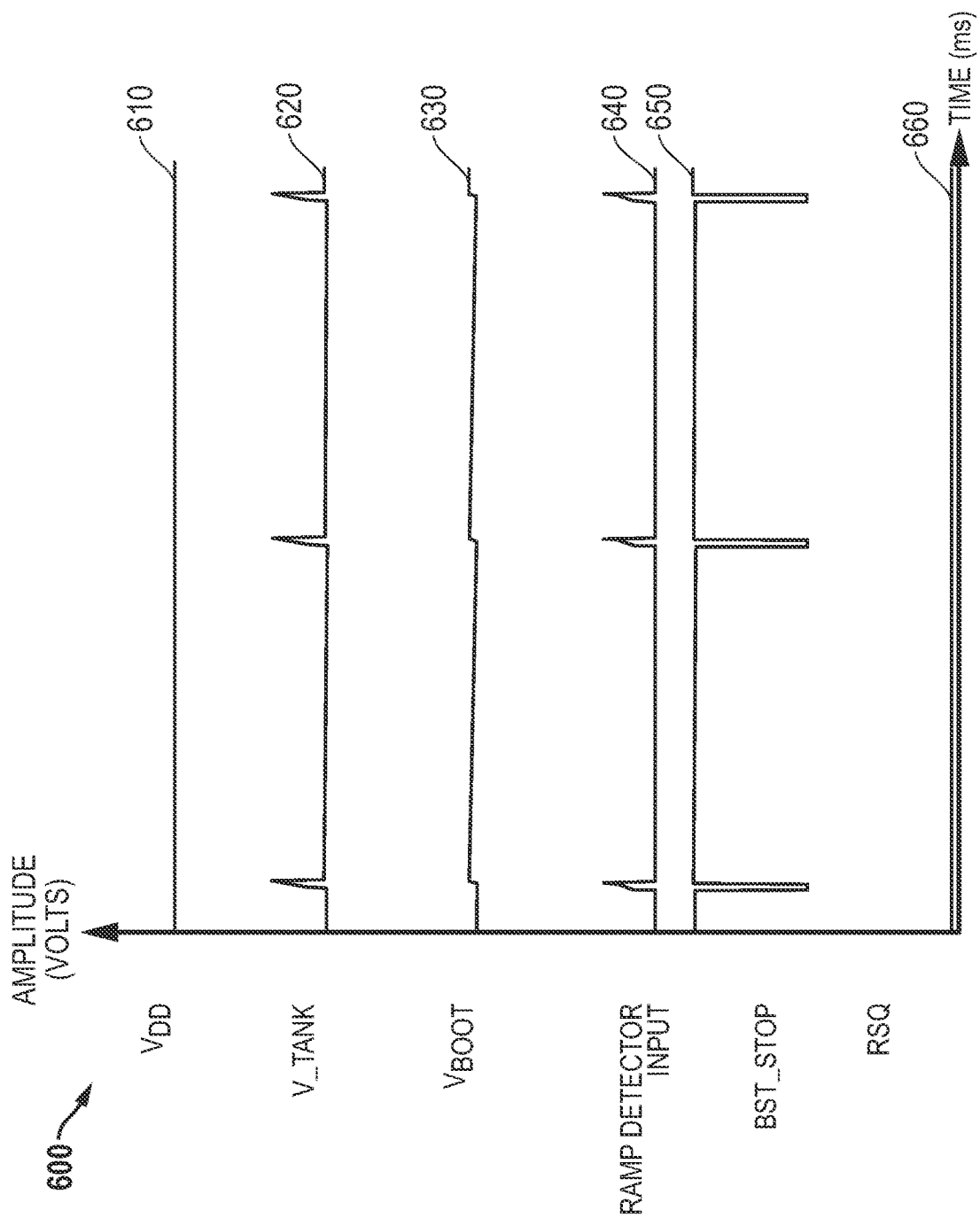
FIG. 6 illustrates a timing diagram of the bootstrap driver circuit of FIG. 4 during a second phase of operation.

FIG. 6 illustrates a timing diagram 600 of the bootstrap driver circuit of FIG. 4 during a second phase of operation. The second phase of operation corresponds to a steady state phase. In timing diagram 600, the horizontal axis represents time in ms, and the vertical axis represents the amplitude of respective signals in volts (V). Shown in timing diagram 600 are waveforms of the same six signals of interest as in timing diagram 500 of FIG. 5, including a waveform 610 of $V_{DD}$, a waveform 620 of V_TANK, a waveform 630 of $V_{BOOT}$, a waveform 640 of the RAMP DETECTOR INPUT signal, a waveform 650 of the BST_STOP signal, and a waveform 660 of the RSQ signal. During the steady-state phase as shown in timing diagram 600, $V_{DD}$ remains constant at around 7.0 V. Over this period, V_TANK is generally low, with occasional spikes for short periods to maintain the $V_{BOOT}$ at approximately 5.0 V. Thus, $V_{BOOT}$ increases in response to the spikes of V_TANK, but decays slowly between the spikes. The RAMP DETECTOR INPUT signal also remains generally low, with occasional spikes for short periods to maintain the $V_{BOOT}$ at approximately 5.0 V. During this period BST_STOP is generally active at a logic high, but pulses low for short periods when the V_TANK and RAMP DETECTOR INPUT signals pulse high. The RSQ signal remains low. These occasional periods of inactivity, on a longer time scale, are sufficient to keep $V_{BOOT}$ well regulated.

Thus, bootstrap driver circuit 200 supports the use of GaN FETs for high-speed operation, but biases them to prevent damage that can occur from excessive $V_{GS}$ levels. It regulates the voltage across a boot capacitor to keep it low enough to protect a GaN FET high side driver. It does so using a simple voltage controlled charge pump circuit that is simple and requires only a small amount of added circuit area.

The above-disclosed subject matter is to be considered illustrative, and not restrictive, and the appended claims are intended to cover all such modifications, enhancements, and other embodiments that fall within the scope of the claims. For example, different combinations of the disclosed features can be used in different embodiments to achieve some of the benefits discussed herein. Moreover, the driver can be used with either a synchronous low-side rectifier or with a passive low-side rectifier. It can also use different charge pump designs. The logic circuits can vary in different embodiments, using either positive logic as illustrated above, or negative logic. Also the circuit can be used with various protection mechanisms.

Thus, to the maximum extent allowed by law, the scope of the present invention is to be determined by the broadest permissible interpretation of the following claims and their equivalents, and shall not be restricted or limited by the forgoing detailed description.

What is claimed is:

1. A driver suitable for use with a gallium nitride (GaN) power stage, comprising:
   a voltage regulator comprising a voltage-controlled charge pump for providing a boot voltage between first and second terminals thereof that varies within a range between a turn-on voltage of a high-side GaN transistor, and a safe voltage limit between a gate and a source thereof throughout an active time of said high-side GaN transistor; and
   a high side driver having an input for receiving a high side drive signal, an output for coupling to said gate of said high-side GaN transistor, a power supply terminal coupled to said first terminal of said voltage regulator, and a ground terminal coupled to said second terminal of said voltage regulator,
   wherein the voltage-controlled charge pump further regulates the boot voltage within the range during a non-overlapping time period after a low-side GaN transistor becomes non-conductive and before said high-side GaN transistor becomes conductive.

2. The driver of claim 1, wherein:
   said voltage-controlled charge pump has a first input for receiving said boot voltage, a second input, and an output; and
   said voltage regulator further comprises a pass transistor having a first current electrode for receiving an input voltage, a second current electrode for providing said boot voltage, and a control electrode coupled to said output of said voltage-controlled charge pump.

3. The driver of claim 2, further comprising:
   a high voltage diode having an anode for receiving a power supply voltage, and a cathode for providing said input voltage.

4. The driver of claim 2, further comprising:
   a capacitor having first terminal coupled to said second current electrode of said pass transistor, and a second terminal coupled to said second terminal of said voltage regulator.

5. The driver of claim 2, wherein said voltage-controlled charge pump comprises:
   a charge pump having a first input coupled to said second current electrode of said pass transistor, a second input coupled to said second input of said voltage-controlled charge pump, first and second control inputs for receiving a boost control signal and a transfer control signal, respectively, and an output coupled to said control electrode of said pass transistor;
   a ramp detector for detecting whether a voltage of said charge pump is between first and second voltages corresponding to said safe voltage limit between said gate and said source of said high-side GaN transistor and having an output; and
   a logic circuit responsive to said output of said ramp detector for generating said boost control signal and said transfer control signal.

6. The driver of claim 5, wherein:
   said voltage-controlled charge pump further comprises an overvoltage detection circuit having an output; and
   said logic circuit is further responsive to said output of said overvoltage detection circuit to keep said boost control signal inactive.

7. The driver of claim 5, wherein:
   said voltage-controlled charge pump further comprises a low power supply voltage detection circuit having an output; and
   said logic circuit is further responsive to said output of said low power supply voltage detection circuit to keep said boost control signal inactive.

8. The driver of claim 5, wherein:
   said voltage-controlled charge pump further comprises a pre-charging circuit having a first terminal for receiving said input voltage, and a second terminal coupled to said control electrode of said pass transistor.

9. A power converter, comprising:
   a first GaN transistor having a first current electrode for receiving an input voltage, a control electrode, and a second current electrode coupled to an inductive node; and
   a first driver having a first input for receiving a second input voltage, a control input for receiving a drive signal, and an output coupled to said first GaN transistor, wherein said first driver is responsive to a voltage on said second current electrode of said first GaN transistor to control a voltage on a gate of said first GaN transistor to limit a gate-to-source voltage between a turn-on voltage of said first GaN transistor and a safe voltage limit throughout an active time of said first GaN transistor, wherein said first driver comprises:
      a voltage regulator comprising a voltage-controlled charge pump for providing a boot voltage between first and second terminals thereof that varies within a range between said turn-on voltage of a first GaN transistor, and said safe voltage limit between said gate and a source thereof, and
      a high side driver having an input for receiving a high side drive signal, an output for coupling to said gate of said first GaN transistor, a power supply terminal coupled to said first terminal of said voltage regulator, and a ground terminal for coupled to said second terminal of said voltage regulator, wherein the voltage-controlled charge pump further regulates the boot voltage within the range during a non-overlapping time period after a second GaN transistor in series with the first GaN transistor becomes non-conductive and before said first GaN transistor becomes conductive.

10. The power converter of claim 9, wherein:
said voltage-controlled charge pump has a first input for receiving said boot voltage, a second input, and an output; and
said voltage regulator further comprises a pass transistor having a first current electrode for receiving an input voltage, a second current electrode for providing said boot voltage, and a control electrode coupled to said output of said voltage-controlled charge pump.

11. The power converter of claim 10, further comprising:
a high voltage diode having an anode for receiving a power supply voltage, and a cathode for providing said input voltage.

12. The power converter of claim 10, further comprising:
a capacitor having first terminal coupled to said second current electrode of said pass transistor, and a second terminal coupled to said second terminal of said voltage-controlled charge pump.

13. The power converter of claim 10, wherein said voltage-controlled charge pump comprises:
a charge pump having a first input coupled to said second current electrode of said pass transistor, a second input coupled to said second input of said voltage-controlled charge pump, first and second control inputs for receiving a boost control signal and a transfer control signal, respectively, and an output coupled to said control electrode of said pass transistor;
a ramp detector for detecting whether a voltage of said charge pump is between first and second voltages corresponding to said safe voltage limit between said gate and said source of said first GaN transistor and having an output; and
a logic circuit responsive to said output of said ramp detector for generating said boost control signal and said transfer control signal.

14. The power converter of claim 9, wherein:
said first GaN transistor is a high-side switch of a buck converter; and
the power converter further comprises:

a second GaN transistor having a first current electrode coupled to said inductive node, a control electrode, and a second current electrode coupled to a ground terminal; and
a second driver having an input for receiving a second drive signal, and an output coupled to said control electrode of said second GaN transistor.

15. A method for protecting a high-side GaN transistor having a first current electrode for receiving an input voltage, a control electrode, and a second current electrode coupled to an inductive node, comprising:
sensing a voltage at the inductive node;
sensing a boot voltage; and
driving the control electrode of the high-side GaN transistor using the boot voltage, said driving comprising regulating a voltage at the control electrode of the high-side GaN transistor to limit a gate-to-source voltage between a turn-on voltage of the high-side GaN transistor and a safe voltage limit throughout an active time of the high-side GaN transistor, wherein said regulating comprises regulating a voltage difference between said voltage at the inductive node and said boot voltage using a voltage-controlled charge pump,
wherein the method further comprising regulating the boot voltage between the turn-on voltage and the safe voltage limit throughout an active time of the high-side GaN transistor during a non-overlapping time period after a low-side GaN transistor becomes non-conductive and before the high-side GaN transistor becomes conductive.

16. The method of claim 15, wherein said regulating comprises:
charging a pump capacitor during a first phase;
transferring charge from said pump capacitor to a tank capacitor during a second phase; and
controlling a timing of said first phase and said second phase based on detecting whether a voltage on said pump capacitor is between first and second voltages.

17. The method of claim 16, further comprising:
detecting an overvoltage condition of said boot voltage; and
remaining in said second phase in response to said overvoltage condition.

18. The method of claim 16, further comprising:
detecting a low power supply voltage condition; and
remaining in said second phase in response to said low power supply voltage condition.

* * * * *